US008611373B2

(12) United States Patent
Ohara (10) Patent No.: US 8,611,373 B2
(45) Date of Patent: Dec. 17, 2013

(54) COMMUNICATION DEVICE

(75) Inventor: Kiyotaka Ohara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/228,935

(22) Filed: Sep. 9, 2011

(65) Prior Publication Data

US 2012/0076218 A1 Mar. 29, 2012

(30) Foreign Application Priority Data

Sep. 29, 2010 (JP) ................................. 2010-218991

(51) Int. Cl.
*H04J 3/16* (2006.01)

(52) U.S. Cl.
USPC ...... 370/468; 370/230.11; 370/231; 370/235; 370/437; 370/465; 375/225; 375/240; 375/260

(58) Field of Classification Search
USPC ............. 370/230.1, 231, 235, 436, 437, 465; 375/225, 240, 260
See application file for complete search history.

(56) References Cited

U.S. PATENT DOCUMENTS

| 6,765,906 | B1 * | 7/2004 | Suzuki ........................... 370/389 |
| 6,967,921 | B1 * | 11/2005 | Levy et al. ................. 370/230.1 |
| 6,975,648 | B2 * | 12/2005 | Kikuchi et al. ............... 370/468 |
| 7,450,510 | B1 * | 11/2008 | Wendorf et al. .............. 370/235 |
| 7,920,592 | B2 * | 4/2011 | Lu et al. ........................ 370/468 |
| 8,254,252 | B2 * | 8/2012 | Hinosugi et al. ............. 370/229 |
| 2004/0202175 | A1 * | 10/2004 | Horioka et al. ............ 370/395.1 |
| 2005/0089064 | A1 * | 4/2005 | Zimmerman et al. ........ 370/468 |
| 2008/0043654 | A1 * | 2/2008 | Lakkis .......................... 370/310 |
| 2009/0059905 | A1 * | 3/2009 | Barzegar et al. ............. 370/352 |

FOREIGN PATENT DOCUMENTS

JP 2009-033269 A 2/2009

* cited by examiner

*Primary Examiner* — Asad Nawaz
*Assistant Examiner* — Khaled Kassim
(74) *Attorney, Agent, or Firm* — Scully, Scott, Murphy & Presser, PC (57) ABSTRACT

A first communication device includes: a control unit functioning as: a first selection unit which, for a first case where first type data is to be transmitted from the first communication device to a second communication device, selects one or more band guarantee values from a plurality of band guarantee values determined on a basis of transmission capability with which the first communication device transmits the first type data; a request unit which provides a first request command indicating the one or more band guarantee values to the second communication device; a communication unit that acquires a first response command indicating one band guarantee value selected from the one or more band guarantee values by the second communication device; and a first transmission execution unit which transmits the first type data to the second communication device in accordance with the one band guarantee value indicated by the first response command.

7 Claims, 6 Drawing Sheets

COMMUNICATION DEVICE

CROSS-REFERENCE TO RELATED APPLICATIONS

This application claims priority from Japanese Patent Application No. 2010-218991 filed on Sep. 29, 2010, the entire subject matter of which is incorporated herein by reference.

TECHNICAL FIELD

The present invention relates to a communication device that is connected to another communication device via a network.

BACKGROUND

There has been disclosed a user terminal that makes a request for band guarantee to a server. When the user terminal receives a distribution service of video contents, for example, the user terminal makes a request for band guarantee corresponding to a relatively high communication speed (1,024 kbps). In addition, when the user terminal receives a distribution service of music contents, for example, the user terminal makes a request for band guarantee corresponding to a relatively low communication speed (64 kbps). In other words, the user terminal selects one of a plurality of band guarantee values depending on types of data (video, music and the like) that the user terminal is to receive, and makes a request for band guarantee with respect to the selected one band guarantee value.

SUMMARY

Illustrative aspects of the invention provide a technique that enables a communication device to perform communication in accordance with appropriate band guarantee.

DETAILED DESCRIPTION

<General Overview>

The above-described related-art technology does not consider communication capability of the user terminal itself. Thus, even though the user terminal itself can receive the video contents only at the communication speed of up to 512 kbps, the user terminal may make a request for band guarantee corresponding to 1,024 kbps, for example. In this case, even when the band guarantee corresponding to 1,024 kbps is secured, the user terminal receives the video contents at the communication speed of 512 kbps. Usually, for the band guarantee having the higher communication speed to be guaranteed, a billing rate is greater. Therefore, even when the user terminal performs communication at the communication speed of 512 kbps, a billing rate of the band guarantee corresponding to 1,024 kbps is applied for the user terminal.

Therefore, illustrative aspects of the invention provide a technique that enables a communication device to perform communication in accordance with appropriate band guarantee.

According to one illustrative aspect of the invention, there is provided a first communication device that is configured to be connected to a second communication device via a network, the first communication device comprising: a control unit; and a memory that stores a program including instructions to be executed by the control unit, wherein the instructions, when executed by the control unit, cause the control unit to function as: a first selection unit that is configured to, for a first case where first type data is to be transmitted from the first communication device to the second communication device, select one or more band guarantee values from a plurality of band guarantee values, which are determined on a basis of transmission capability with which the first communication device transmits the first type data; a request unit that is configured to provide a first request command, which indicates the one or more band guarantee values, to the second communication device; a communication unit that is configured to acquire a first response command, which indicates one band guarantee value that is selected from the one or more band guarantee values by the second communication device, from the second communication device in response to the first request command; and a first transmission execution unit that is configured to transmit the first type data to the second communication device in accordance with the one band guarantee value indicated by the first response command.

According thereto, the first communication device selects one or more band guarantee values that are determined based on the transmission capability with which the first communication device transmits the first type data and provides the second communication device with the first request command indicating the one or more band guarantee values, (i.e., makes a request for band guarantee). Therefore, the first communication device can transmit the first type data to the second communication device in accordance with the appropriate band guarantee corresponding to the transmission capability of the first communication device.

According to another illustrative aspect of the invention, for the first case, the first selection unit selects a first band guarantee value corresponding to a first communication speed that is a minimum communication speed among a plurality of communication speeds corresponding to the plurality of band guarantee values, the minimum communication speed being capable of realizing the transmission capability with which the first communication device transmits the first type data, and the first selection unit does not select a second band guarantee value corresponding to a second communication speed which is higher than the first communication speed.

According thereto, the first communication device does not select the second band guarantee value corresponding to the second communication speed that drastically exceeds the transmission capability for transmitting the first type data. Therefore, the first communication device can transmit the first type data to the second communication device in accordance with the appropriate band guarantee (for example, first band guarantee value).

According to still another illustrative aspect of the invention, for the first case, the first selection unit further selects a third band guarantee value corresponding to a third communication speed that is lower than the first communication speed.

According to still another illustrative aspect of the invention, wherein for the first case, when a difference between the transmission capability with which the first communication device transmits the first type data and the third communication speed is larger than a predetermined value, the first selection unit selects the first band guarantee value and the third band guarantee value without selecting the second band guarantee value, and wherein for the first case, when the difference between the transmission capability with which the first communication device transmits the first type data and the third communication speed is smaller than the predetermined value, the first selection unit selects the third band guarantee value without selecting the first band guarantee value and the second band guarantee value.

According thereto, the first communication device can transmit the first type data to the second communication device in accordance with the appropriate band guarantee corresponding to the transmission capability of the first communication device.

According to still another illustrative aspect of the invention, in the first communication device, wherein the memory is further configured to, for each of a plurality of applications, store the transmission capability with which the first communication device transmits the data in accordance with a respective one of the plurality of applications, and wherein for the first case where the first type data is to be transmitted from the first communication device to the second communication device in accordance with an application among the plurality of applications for transmitting the first type data, the first selection unit acquires the transmission capability corresponding to the application for transmitting the first type data from the memory and selects the one or more band guarantee values based on the acquired transmission capability.

According thereto, the first communication device can transmit the first type data to the second communication device in accordance with the appropriate band guarantee corresponding to the transmission capability of the application for transmitting the first type data.

According to still another illustrative aspect of the invention, wherein for a second case where second type data is to be received from the second communication device, the request unit further provides the second communication device with a second request command indicating the plurality of band guarantee values, and the communication unit acquires a second response command indicating one band guarantee value that is selected from the plurality of band guarantee values by the second communication device from the second communication device in response to the second request command, and wherein the first communication device further comprises a first reception execution unit that receives the second type data from the second communication device in accordance with the one band guarantee value that is indicated by the second response command.

According thereto, since the first communication device receives the second type data from the second communication device, the first communication device does not have to make a request for band guarantee corresponding to the transmission capability of the first communication device. Thus, the first communication device makes a request for a plurality of band guarantee values. The first communication device can make a request for appropriate band guarantee value in correspondence to a subject of the data transmission (first communication device or second communication device).

According to still another illustrative aspect of the invention, there is provided a second communication device that is configured to be connected to a first communication device via a network, the second communication device comprising: a control unit; and a memory that stores a program including instructions to be executed by the control unit, wherein the instructions, when executed by the control unit, cause the control unit to function as: an acquiring unit that is configured to, for a third case where third type data is to be transmitted from the second communication device to the first communication device, acquire a third request command indicating a plurality of band guarantee values from the first communication device; a second selection unit that is configured to select one band guarantee value from the plurality of band guarantee values indicated by the third request command, the one band guarantee value being determined on the basis of transmission capability with which the second communication device transmits the third type data; a provision unit that is configured to provide the first communication device with a third response command indicating the one band guarantee value that is selected in accordance with the third request command; and a second transmission execution unit that is configured to transmit the third type data to the first communication device in accordance with the one band guarantee value that is selected in accordance with the third request command.

According thereto, the second communication device selects one band guarantee value, which is determined on the basis of the transmission capability with which the second communication device transmits the second type data, in accordance with the request for the plurality of band guarantee values from the first communication device, and provides the first communication device with the third response command indicating the one band guarantee value. Accordingly, the second communication device can transmit the third type data to the first communication device in accordance with the appropriate band guarantee corresponding to the transmission capability of the second communication device.

According to still another illustrative aspect of the invention, for the third case, the second selection unit selects the one band guarantee value corresponding to a minimum communication speed among a plurality of communication speeds corresponding to the plurality of band guarantee values, the minimum communication speed being capable of realizing the transmission capability with which the second communication device transmits the third type data.

According thereto, the second communication device can transmit the third type data to the first communication device in accordance with the appropriate band guarantee corresponding to the transmission capability of the second communication device.

According to still another illustrative aspect of the invention, in the second communication device, the memory is further configured to, for each of a plurality of applications, store the transmission capability with which the second communication device transmits the data in accordance with a respective one of the plurality of applications, and wherein for the third case in which the third type data is to be transmitted from the second communication device to the first communication device in accordance with an application among the plurality of applications for transmitting the third type data, the second selection unit acquires the transmission capability corresponding to the application for transmitting the third type data from the memory and selects the one band guarantee value based on the acquired transmission capability.

According thereto, the second communication device can transmit the third type data to the first communication device in accordance with the appropriate band guarantee corresponding to the transmission capability of the application for transmitting the third type data.

According to still another illustrative aspect of the invention, wherein for a fourth case in which fourth type data is to be received from the first communication device, the acquiring unit further acquires a fourth request command indicating one or more of the plurality of band guarantee values, the second selection unit further selects, from the one or more band guarantee values indicated by the fourth command, one band guarantee value corresponding to a maximum communication speed of one or more communication speeds corresponding to the one or more band guarantee values, and the provision unit further provides the first communication device with a fourth response command indicating the one band guarantee value that is selected in accordance with the fourth request command, and wherein the second communication device further comprises a second reception execution unit that is configured to receive the fourth type data from the first communication device in accordance with the one band guarantee value that is selected in accordance with the fourth response command.

According thereto, since the second communication device receives the fourth type data from the first communication device, the second communication device does not have to select a band guarantee value corresponding to the transmission capability of the second communication device. Thus, the second communication device selects one band guarantee value corresponding to the maximum communication speed so that the rapid communication is performed. The second communication device can select an appropriate band guarantee value in correspondence to the subject of the data transmission (first communication device or second communication device).

Incidentally, a control method for implementing the first communication device, a computer program and a recording medium storing the computer program are also novel and useful. In addition, a control method for implementing the second communication device, a computer program and a non-transitory computer-readable medium storing the computer program are also novel and useful. Further, a communication system including the first and second communication devices is also novel and useful.

Exemplary Embodiments

Exemplary embodiments of the invention will now be described with reference to the drawings.

(System Configuration)

Figure 1:
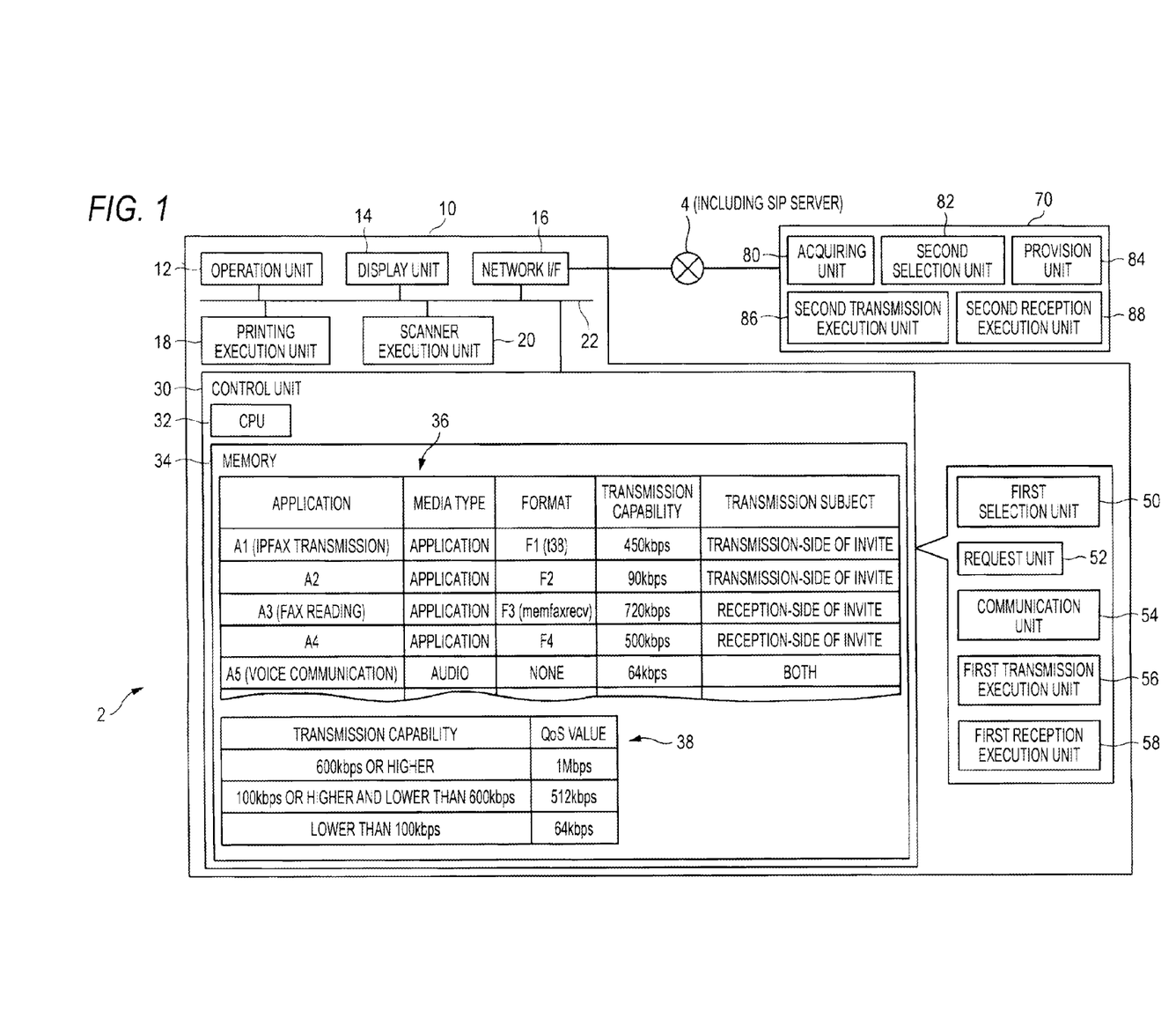
FIG. 1 shows a configuration example of a communication system according to an exemplary embodiment of the invention.

FIG. 1 is a schematic view of a communication system 2 according to the exemplary embodiment. The communication system 2 includes a plurality of multi-function devices 10, 70. The multi-function devices 10, 70 are respectively connected to different LANs and can communicate with each other via an Internet 4. In this exemplary embodiment, the respective multi-function devices 10, 70 perform communication in accordance with session initiation protocol (SIP). Accordingly, the Internet 4 includes an SIP server (not shown). In the communication system 2, when the communication is performed in the respective multi-function devices 10, 70, a billing server on the Internet 4 executes a billing process according to communication time (or communication data amount). Incidentally, communication rates per unit time are different depending on band guarantee values.

(Configuration of Multi-Function Device 10)

The multi-function device 10 can execute a plurality of functions such as printing, scanner, copying, IPFAX, FAX reading, voice communication (i.e., telephone function) functions and the like. The multi-function device 10 includes an operation unit 12, a display unit 14, a network interface 16, a printing execution unit 18, a scan execution unit 20 and a control unit 30. The operation unit 12 includes a plurality of keys. A user can operate the operation unit 12 to input various instructions to the multi-function device 10. The display unit 14 is a display for displaying a variety of information. The network interface 16 is connected to the Internet 4 via the LAN. The printing execution unit 18 includes a printing mechanism of an ink jet head type, a laser type, an LED type and the like, and executes a printing operation in response to an instruction from the control unit 30. The scan execution unit 20 includes a scan mechanism of CCD, CIS and the like, and executes a scanning operation in response to an instruction from the control unit 30.

The control unit 30 includes a CPU 32 and a memory 34. The CPU 32 executes a variety of processes in response to programs (not shown) in the memory 34. As the CPU 32 executes the processes in response to the programs, the functions of the respective units 50 to 58 are implemented. Incidentally, the programs include a plurality of applications. The plurality of applications includes an application for executing the IPFAX transmission function, an application for executing the FAX reading function and an application for executing the voice communication function, for example. The memory 34 stores therein an application table 36 and a threshold table 38.

(Application Table 36)

The application table 36 is a table in which an application name, a media type, a format, transmission capability and a transmission subject are associated. The application name is a name of an application. The media type and format are information that is used in performing communication in accordance with the SIP. In this exemplary embodiment, two media types of 'Application' and 'Audio' are used. When the media type is 'Application', various formats of 'F1' to 'F4' are used. In FIG. 1, 't38' and 'memfaxrecv' of 'F1' and 'F3' are shown as specific examples of the format. Incidentally, when the media type is 'Audio', there is no format.

The transmission capability is transmission capability (i.e., maximum communication speed) with which the multi-function device 10 transmits data in accordance with an application. For example, the multi-function device 10 can execute the IPFAX transmission at the communication speed of maximum 450 kbps in accordance with an application A1. When the application is different, the transmission capability may be different. The reasons will be described as follows.

For example, the IPFAX transmission function is a function for transmitting scan data, which is generated by the scan execution unit 20, to an outside. Accordingly, when the scan execution unit 20 can generate scan data at high speed, the multi-function device 10 can transmit the scan data at high speed, whereas when the scan execution unit 20 cannot generate scan data at high speed, the multi-function device 10 cannot transmit the scan data at high speed. In other words, when the application A1 is used, the transmission capability depends on hardware performance of the scan execution unit 20. On the other hand, the FAX reading function is a function for transmitting image data, which indicates FAX data received in the past and stored in the memory 34, to the outside. Accordingly, when the application A3 is used, the transmission capability does not depend on hardware performance. Therefore, regarding the applications A1, A3, the transmission capabilities may be different. In addition, the transmission capability may be different depending on whether the hardware is used and the performance of the application itself.

The transmission subject indicates whether a subject of transmitting data is a transmission side of an INVITE command of the SIP, a reception side thereof or both of them. For example, in the IPFAX transmission function, the scan data that is generated by a transmission-side device of the INVITE is transmitted to a reception-side device of the INVITE. Accordingly, the 'transmission-side of the INVITE' is associated in the application A1. Further, in the FAX reading function, for example, the image data, which indicates FAX data received in the past by the reception-side device of the INVITE, is transmitted to the transmission-side device of the INVITE. Accordingly, the 'reception-side of the INVITE' is associated in the application A3. Still further, in the voice communication function, for example, the voice data is transmitted from both the transmission-side device of the INVITE and the reception-side device of the INVITE. Accordingly, both the 'transmission-side' and the 'reception-side' are associated in the application A3.

(Threshold Table 38)

The threshold table 38 is a table in which a range of the transmission capability and a band guarantee value (QoS (Quality of Service) value) are associated. In this exemplary embodiment, three band guarantee values (1 Mbps, 512 kbps and 64 kbps) are used. Incidentally, in a modified exemplary embodiment, two band guarantee values may be used, or three or more band guarantee values may be used.

(Install Method of Each Table 36, 38)

Regarding a plurality of applications installed in the multi-function device 10, a vender of the multi-function device 10 inspects each of the transmission capability of the multi-function device 10 using a respective one of the plurality of applications. Based on the inspection result, the vender creates the application table 36 and stores the application table 36 in the memory 34. In addition, the vender creates the threshold table 38 and stores the threshold table 38 in the memory 34. Accordingly, when the multi-function device 10 is shipped out, the respective tables 36, 38 are installed beforehand in the multi-function device 10. In a modified exemplary embodiment, the respective tables 36, 38 may be installed in the multi-function device 10 from a server, which is provided by the vender, via the Internet 4.

(Configuration of Multi-Function Device 70)

The multi-function device 70 has the same configuration as the multi-function device 10. As a CPU of the multi-function device 70 executes the processes in accordance with the programs, functions of respective units 80 to 88 are implemented. Incidentally, the programs installed in the multi-function device 10 are the same as those installed in the multi-function device 70. Accordingly, the multi-function device 10 includes not only the respective units 50 to 58 but also the respective units 80 to 88, and the multi-function device 70 includes the respective units 50 to 58 as well as the respective units 80 to 88. In order to easily understand the technology, it will be described that the multi-function device 10 includes only the respective units 50 to 58 and the multi-function device 70 includes only the respective units 80 to 88. The multi-function device 70 further includes a memory (not shown) in which the same tables as the respective tables 36, 38 are stored.

(Processes that are Executed by Multi-Function Devices 10, 70)

Figure 2:
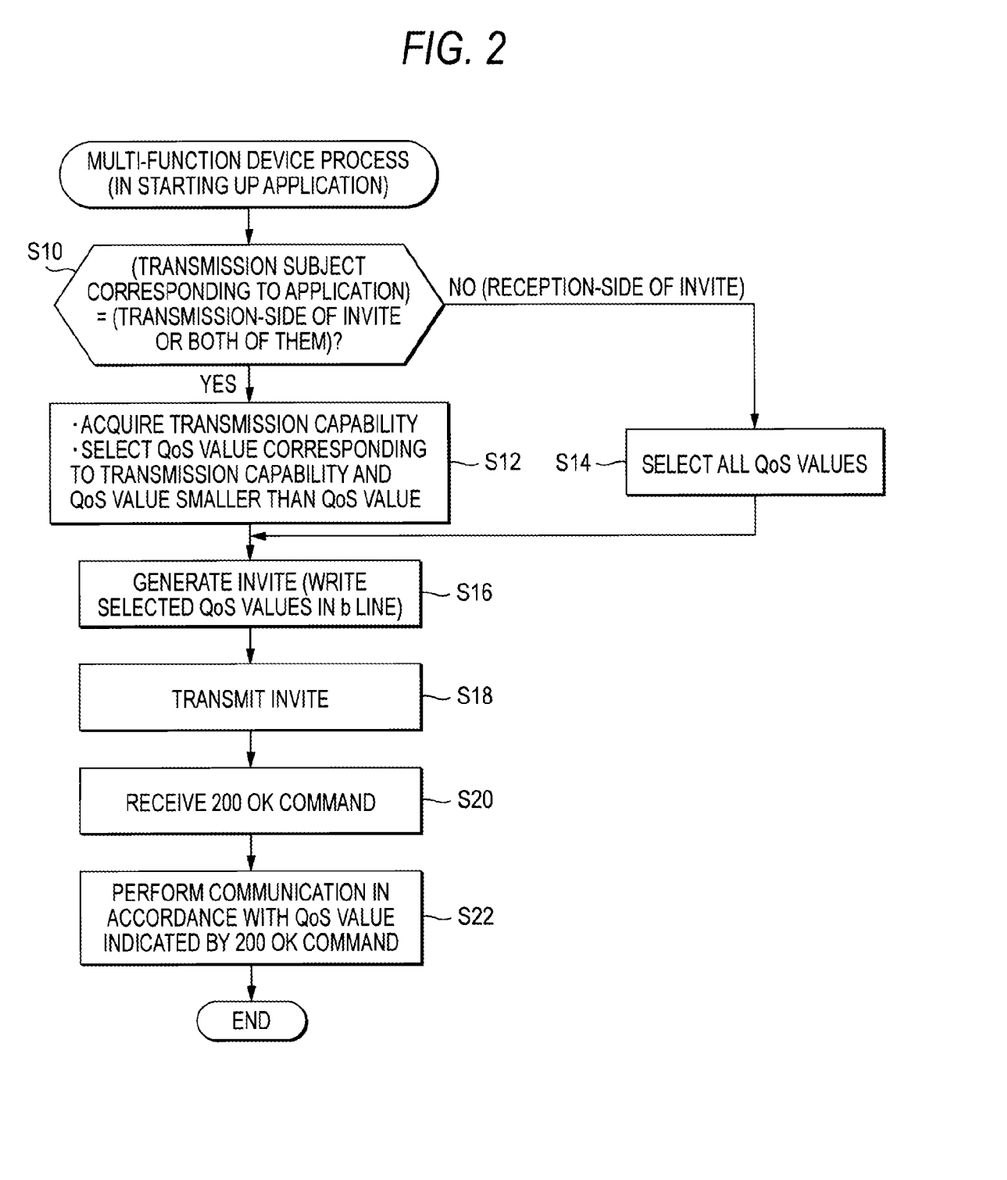
FIG. 2 shows a flow chart of a process that is executed by a multi-function device when starting up an application.
Figure 3:
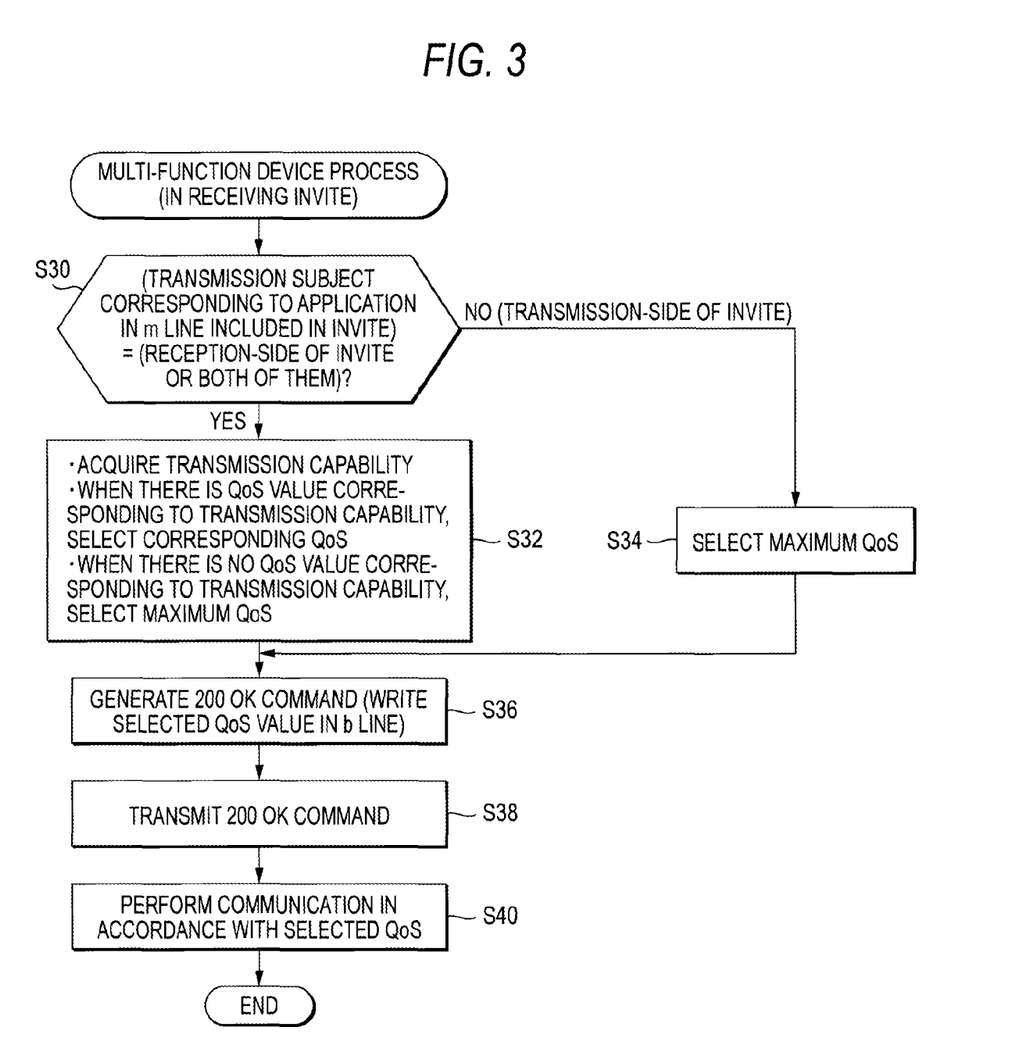
FIG. 3 shows a flow chart of a process that is executed by the multi-function device when receiving an INVITE command.

The multi-function devices 10, 70 can execute flow charts shown in FIGS. 2 and 3. In the followings, however, it will be described that the multi-function device 10 executes the flow chart shown in FIG. 2, and the multi-function device 70 executes the flow chart shown in FIG. 3.

(Flow Chart of FIG. 2)

With the operation unit 12, a user of the multi-function device 10 can perform a predetermined operation for selecting a function (for example, IPFAX transmitting function) that the multi-function device 10 is to perform communication from a plurality of functions that the multi-function device 70 can execute. The predetermined operation includes an operation that the user designates SIPURI (for example, SIPURI of the multi-function device 70), which is an example of identification information of a communication destination. In this case, the control unit 30 starts up an application (for example, application 'A1') corresponding to a function selected by the user and executes a communication process (for example, refer to S22 of FIG. 2) in accordance with the application. However, the control unit 30 executes processes of S10 to S20 of FIG. 2 in accordance with a specific program in the memory 34 before performing the communication process.

In S10, a first selection unit 50 (refer to FIG. 1) refers to the application table 36 to acquire the 'transmission subject' that is associated with the application corresponding to the function selected by the user. Then, the first selection unit 50 determines whether the acquired 'transmission subject' indicates the 'transmission-side of the INVITE' or 'both of them' or the 'reception-side of the INVITE.'

When the acquired 'transmission subject' indicates the 'transmission-side of the INVITE' or 'both of them' (YES in S10), the first selection unit 50 refers to the application table 36 to acquire the 'transmission capability' that is associated with the application corresponding to the function selected by the user (S12). In S12, the first selection unit 50 further refers to the threshold table 38 to select one or more of the three QoS values (1 Mbps, 512 kbps, 64 kbps). Specifically, the first selection unit 50 selects one QoS value (for example, 512 kbps) that is associated with the range of the transmission capability (for example, 100 kbps or higher and lower than 600 kbps) including the acquired 'transmission capability (for example, 450 kbps)'. Further, when there is a QoS value (for example, 64 kbps) smaller than the one selected QoS value (for instance, 512 kbps), the first selection unit 50 further selects all QoS values (for example, 64 kbps) smaller than the one selected QoS value (for instance, 512 kbps). When the step of S12 is completed, the control unit proceeds to S16.

On the other hand, when the acquired 'transmission subject' indicates the 'reception-side of the INVITE' (NO in S10), the first selection unit 50 selects all of the three QoS values (S14). When the step of S14 is completed, the control unit proceeds to S16.

In S16, a request unit 52 (refer to FIG. 1) generates an INVITE command. First, the request unit 52 refers to the application table 36 to acquire a 'media type' and a 'format' that are associated with the application corresponding to the function selected by the user. Then, the request unit 52 writes the acquired 'media type' and 'format' in an m line of the INVITE command (which will be described later). Further, in S16, the request unit 52 writes the QoS values selected in S12 or S14 of FIG. 2 in a b line of the INVITE command (which will be described later).

Then, in S18, the request unit 52 transmits the INVITE command generated in S16 to the SIP server on the Internet 4 while using the SIPURI designated by the user as a transmission destination (i.e., the request unit makes a request for band guarantee value (QoS)). In the followings, it is assumed that the SIPURI of the multi-function device 70 is a transmission destination. As a result, the SIP server transmits the INVITE command to the multi-function device 70. The multi-function device 70 receives the INVITE command and executes the flow chart of FIG. 3.

The multi-function device 70 executes the flow chart of FIG. 3 to select one of the one or more QoS values that are included in the INVITE command received from the multi-function device 10 (refer to S32 and S34 of FIG. 3) (which will be described later). The multi-function device 70 transmits a 200 OK command, which indicates the one QoS value that is further selected, to the SIP server (refer to S38 of FIG. 3). The SIP server transmits the 200 OK command to the multi-function device 10. As a result, a communication unit 54 of the multi-function device 10 receives the 200 OK command in S20 of FIG. 2.

Then, in S22, a first transmission execution unit 56 (refer to FIG. 1) or a first reception execution unit 58 (refer to FIG. 1) executes a communication process in accordance with the application corresponding to the function selected by the user. Incidentally, the communication executed in S22 is performed without through the SIP server. In other words, the multi-function device 10 and the multi-function device 70 perform the communication in a Peer to Peer (P2P) manner.

For example, when the 'transmission subject' acquired in S10 is the 'transmission-side of the INVITE', in S22, the first transmission execution unit 56 transmits data of a transmission target (for example, scan data) to the multi-function device 70. In addition, for example, when the 'transmission subject' acquired in S10 is the 'reception-side of the INVITE', in S22, the first reception execution unit 58 receives data of a reception target (for example, image data for FAX reading) from the multi-function device 70. Further, for example, when the 'transmission subject' acquired in S10 indicates 'both of the transmission-side and the reception side', in S22, the first transmission execution unit 56 transmits data of a transmission target (for example, voice data) to the multi-function device 70, and the first reception execution unit 58 receives data of a reception target (for example, voice data) from the multi-function device 70.

Incidentally, in S22, the first transmission execution unit 56 or the first reception execution unit 58 executes the communication process in accordance with the one QoS value (i.e., one QoS value selected by the multi-function device 70) that is indicated by the 200 OK command received in S20. Specifically, any of following (A) and (B) may be used.

(A) For example, when transmitting the 200 OK command to the multi-function device 10 from the multi-function device 70, the SIP server can know the one QoS value that is indicated by the 200 OK command (hereinafter, referred to as 'one QoS value'). The SIP server may notify each of a router, which configures the LAN connected with the multi-function device 10, and a router, which configures the LAN connected with the multi-function device 70, of the one QoS value. As a result, each router adopts the one QoS value as the communication speed of the communication that is performed between the multi-function device 10 and the multi-function device 70. Thereby, in S22, the communication process is executed in accordance with the one QoS value.

(B) In addition, for example, the multi-function device 10 may notify the router, which configures the LAN connected with the multi-function device 10 itself, of the one QoS value. The multi-function device 70 may notify the router, which configures the LAN connected with the multi-function device 70 itself, of the one QoS value. Thereby, in S22, the communication process is executed in accordance with the one QoS value.

(Flow Chart of FIG. 3)

As described above, the multi-function device 10 transmits the INVITE command to the multi-function device 70 through the SIP server (refer to S18 of FIG. 2). Thereby, an acquiring unit 80 of the multi-function device 70 (refer to FIG. 1) acquires the INVITE command from the multi-function device 10 through the SIP server. In this case, a control unit (not shown) of the multi-function device 70 executes the flow chart of FIG. 3. Incidentally, the control unit of the multi-function device 70 starts up an application corresponding to the INVITE command and executes the communication process (refer to S40 of FIG. 3) in accordance with the application. However, before executing communication process, the control unit executes processes of S30 to S38 of FIG. 3 in accordance with a specific program in the memory of the multi-function device 70.

First, in S30, a second selection unit 82 (refer to FIG. 1) acquires the 'media type' and 'format' wrote in the m line of the INVITE command. Further, in S30, the second selection unit 82 refers to an application table (not shown; which is the same as the application table 36 of the multi-function device 10) in the memory of the multi-function device 70 thereby specifying an application associated with the acquired 'media type' and 'format' and acquiring the 'transmission subject' associated with the application. Then, the second selection unit 82 determines whether the acquired 'transmission subject' indicates the 'reception-side of the INVITE' or 'both of them' or the 'transmission-side of the INVITE.'

When the acquired 'transmission subject' indicates the 'reception-side of the INVITE' or 'both of them' (YES in S30), the second selection unit 82 refers to the application table to acquire the 'transmission capability' that is associated with the application specified in S30 (S32). In S32, the second selection unit 82 further refers to a threshold table (not shown; which is the same as the threshold table 38 of the multi-function device 10) to select one of the one or more QoS values included in the b line of the INVITE command. Specifically, when there is one QoS value (for example, 1 Mbps) in the one or more QoS values, which is associated with the range of the transmission capability (for example, 600 kbps or higher) including the acquired 'transmission capability (for example, 720 kbps)', the second selection unit 82 selects the one QoS value (for example, 1 Mbps). On the other hand, when there is no one QoS value in the one or more QoS values, which is associated with the range of the transmission capability including the acquired 'transmission capability', the second selection unit 82 selects a maximum one QoS value from the one or more QoS values. When the step of S32 is completed, the control unit proceeds to S36.

On the other hand, when the acquired 'transmission subject' indicates the 'transmission-side of the INVITE' (NO in S30), the second selection unit 82 selects a maximum one QoS value from the one or more QoS values (S34). When the step of S34 is completed, the control unit proceeds to S36.

In S36, a provision unit 84 (refer to FIG. 1) generates a 200 OK command. Specifically, the provision unit 84 writes the one QoS value selected in S32 or S34 in the 200 OK command. Then, in S38, the provision unit 84 transmits the 200 OK command to the multi-function device 10 through the SIP server.

Then, in S40, a second transmission execution unit 86 (refer to FIG. 1) or second reception execution unit 88 (refer to FIG. 1) executes the communication process (peer to peer communication) in accordance with the application specified in S30.

For example, when the 'transmission subject' acquired in S30 is the 'reception-side of the INVITE', in S40, the second transmission execution unit 86 transmits data of a transmission target (for example, image data for FAX reading) to the multi-function device 10. Further, when the 'transmission subject' acquired in S30 is the 'transmission-side of the INVITE', in S40, the second reception execution unit 88 receives data of a reception target (for example, scan data) from the multi-function device 10. Further, when the 'transmission subject' acquired in S30 indicates 'both of the transmission-side and the reception side', in S40, the second transmission execution unit 86 transmits data of a transmission target (for example, voice data) to the multi-function device 10, and the second reception execution unit 88 receives data of a reception target (for example, voice data) from the multi-function device 10.

Incidentally, in S40, the second transmission execution unit 86 or second reception execution unit 88 executes the communication process in accordance with the one QoS value that is indicated by the 200 OK command generated in S36 (i.e., one QoS value selected by the second selection unit 82). This is the same as S22 of FIG. 2.

Figure 4:
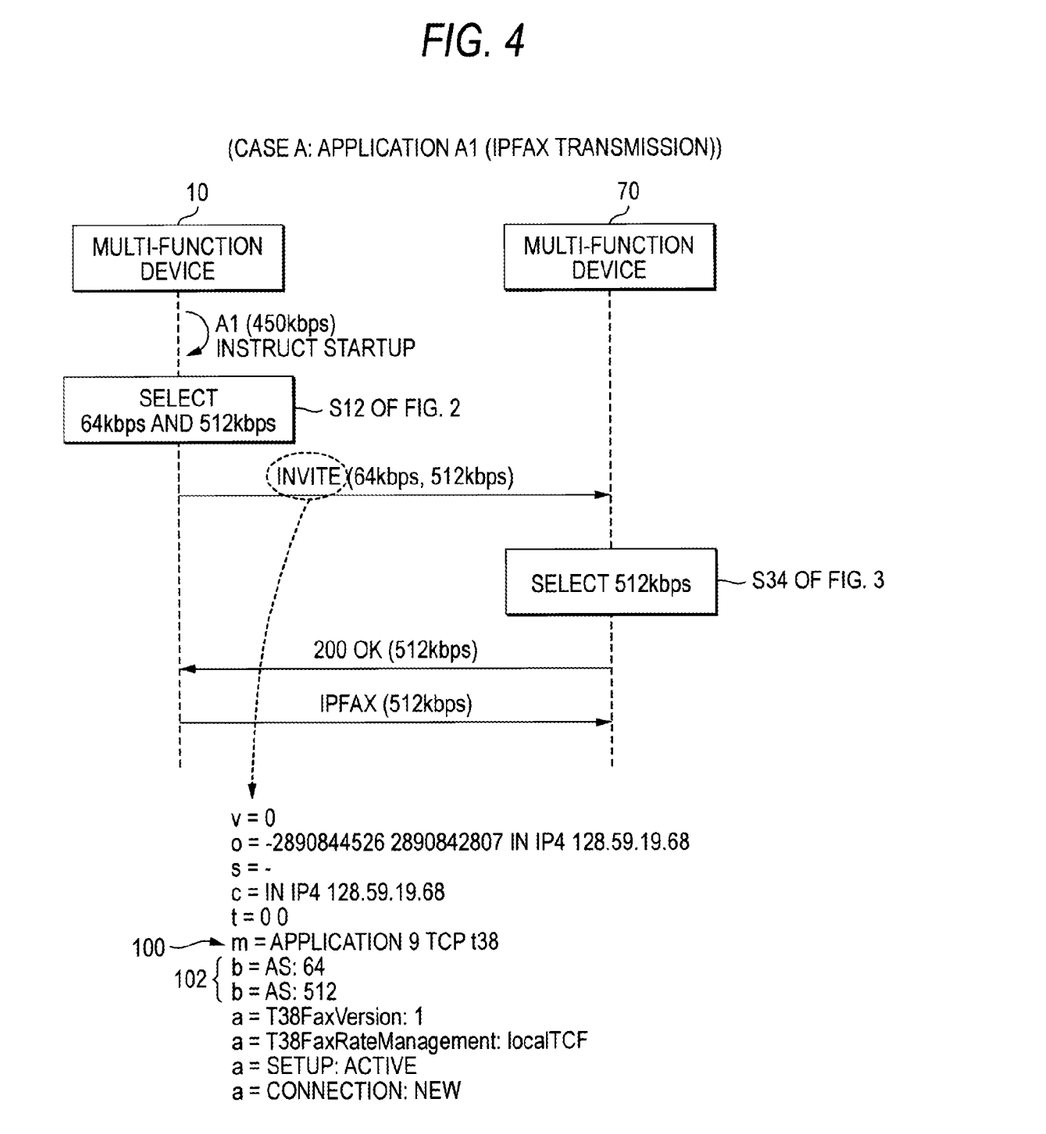
FIG. 4 shows a sequence diagram of a case A corresponding to IPFAX transmission.

(Case A of FIG. 4; IPFAX Transmission Function)

When the IPFAX transmission function is selected by the user of the multi-function device 10, the first selection unit 50 of the multi-function device 10 determines YES in S10 of FIG. 2 because the transmission-side of the INVITE' is associated with the application 'A1.' As a result, the first selection unit 50 refers to the application table 36 to acquire the transmission capability '450 kbps' that is associated with the application 'A1' (refer to S12 of FIG. 2).

Then, the first selection unit 50 refers to the threshold table 38 to select the QoS value '512 kbps' that is associated with the range of the transmission capability '100 kbps or higher and lower than 600 kbps' including the acquired transmission capability '450 kbps' (refer to S12 of FIG. 2). In other words, the first selection unit 50 selects '512 kbps' from the three QoS values as the minimum QoS value that can realize the transmission capability '450 kbps' for transmitting the scan data by the IPFAX transmission function (i.e., application 'A1') from the three QoS values, that is, '512 kbps'. Incidentally, the first selection unit 50 does not select the QoS value '1 Mbps' that is higher than the transmission capability '512 kbps.' According to this configuration, the QoS value '1 Mbps' that remarkably exceeds the transmission capability '450 kbps' is not selected. Accordingly, the multi-function device 10 can transmit the scan data to the multi-function device 70 in accordance with the appropriate band guarantee (for example, '512 kbps') corresponding to the transmission capability of the multi-function device 10.

Further, the first selection unit 50 selects the QoS value '64 kbps' that is lower than the selected '512 kbps' (refer to S12 of FIG. 2). Then, the request unit 52 of the multi-function device 10 refers to the application table 36 to acquire 'application' and 'F1 (t38)' that are associated with the application 'A1' (refer to S16 of FIG. 2). Then, the request unit 52 writes the acquired 'application' and 'F1 (t38)' in the m line 100 of the INVITE command (refer to S16 of FIG. 2). Further, the request unit 52 writes the selected QoS values '64 kbps' and '512 kbps' in the b line 102 of the INVITE command. The request unit 52 transmits the INVITE command to the multi-function device 70 through the SIP server.

The acquiring unit 80 of the multi-function device 70 acquires the INVITE command from the multi-function device 10 through the SIP server. Then, the second selection unit 82 of the multi-function device 70 refers to the application table and specifies the application 'A1', based on the 'application' and 'F1 (t38)', which are wrote in the m line of the INVITE command (refer to S30 of FIG. 3). Then, the second selection unit 82 determines NO in S30 of FIG. 3 because the 'transmission-side of the INVITE' is associated with the application 'A1.'

Then, the second selection unit 82 selects the maximum one QoS value '512 kbps' from the two QoS values '64 kbps' and '512 kbps' included in the b line 102 of the INVITE command (refer to S34 of FIG. 3). According to this configuration, since the multi-function device 70 receives the scan data from the multi-function device 10, the multi-function device 70 does not have to select the QoS value corresponding to the transmission capability of the multi-function device 70. Accordingly, the second selection unit 82 selects the one QoS value '512 kbps' corresponding to the maximum communication speed so as to rapidly perform the communication. Then, the provision unit 84 of the multi-function device 70 transmits the 200 OK command, which indicates the one selected QoS value '512 kbps', to the multi-function device 10 through the SIP server (refer to S38 of FIG. 3).

The communication unit 54 of the multi-function device 10 acquires the 200 OK command from the multi-function device 70 through the SIP server (refer to S20 of FIG. 2). Then, the first transmission execution unit 56 of the multi-function device 10 transmits the scan data, which is generated by the scan execution unit 20, to the multi-function device 70 in accordance with the QoS value '512 kbps' indicated by the 200 OK command (refer to S22 of FIG. 2). The second reception execution unit 88 of the multi-function device 70 receives the scan data from the multi-function device 10 in accordance with the QoS value '512 kbps' indicated by the 200 OK command (refer to S40 of FIG. 2).

Figure 5:
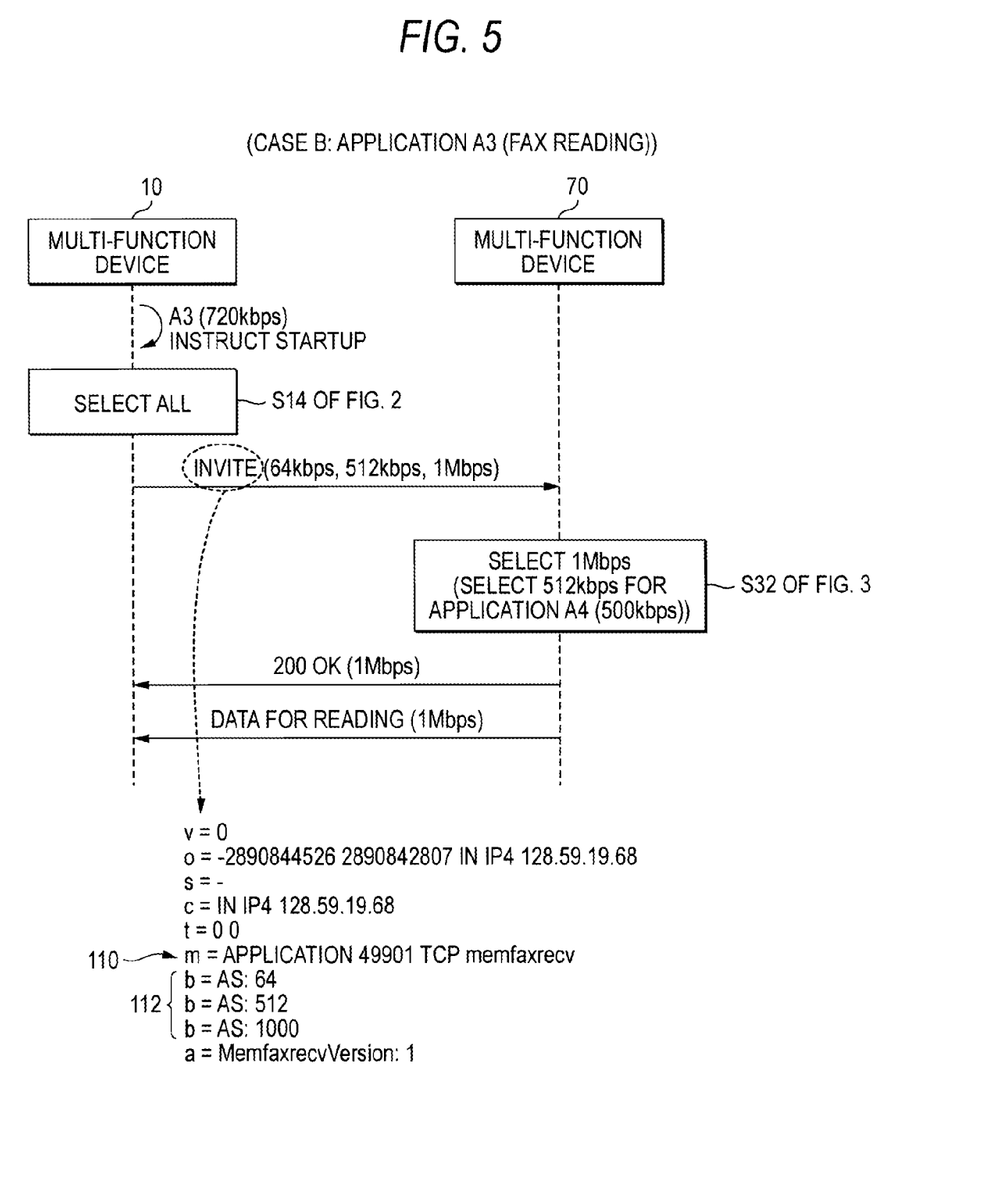
FIG. 5 shows a sequence diagram of a case B corresponding to FAX reading.

(Case B of FIG. 5; FAX Reading Function)

When the FAX reading function is selected by the user of the multi-function device 10, the first selection unit 50 of the multi-function device 10 determines NO in S10 of FIG. 2 because the 'reception-side of the INVITE' is associated with the application 'A3.' As a result, the first selection unit 50 selects all of the three QoS values (S14 of FIG. 2).

Then, the request unit 52 writes 'application' and 'F3 (memfaxrecv)' in the m line 110 of the INVITE command (S16 of FIG. 2). Further, the request unit 52 writes the three selected QoS values in the b line 112 of the INVITE command. The request unit 52 transmits the INVITE command to the multi-function device 70 through the SIP server. According to this configuration, since the multi-function device 10 receives the data (image data for FAX reading) from the multi-function device 70, the multi-function device 10 does not have to make a request for QoS value corresponding to the transmission capability of the multi-function device 10. Therefore, the multi-function device 10 makes a request for all of the three QoS values.

The acquiring unit 80 of the multi-function device 70 acquires the INVITE command from the multi-function device 10 through the SIP server. Then, since the 'reception-side' of the INVITE is associated with the application 'A3', the second selection unit 82 of the multi-function device 70 determines YES in S30 of FIG. 3.

Then, the second selection unit 82 refers to the application table to acquire the transmission capability '720 kbps' associated with the application 'A3' (refer to S32 of FIG. 3). Then, the second selection unit 82 refers to the threshold table to select the QoS value '1 Mbps' associated with '1 Mbps or higher' including the acquired transmission capability '720 kbps' (refer to S32 of FIG. 3). In other words, the second selection unit 82 selects '1 Mbps' of the three QoS values as the minimum QoS value that can realize the transmission capability '720 kbps' for transmitting the image data for FAX reading by the FAX reading function (i.e., application 'A3')

of the three QoS values, that is, '1 Mbps'. According to this configuration, the multi-function device 70 can transmit the image data for FAX reading to the multi-function device 10 in accordance with the appropriate QoS value corresponding to the transmission capability of the multi-function device 70.

Then, the provision unit 84 of the multi-function device 70 transmits the 200 OK command, which indicates the one selected QoS value '1 Mbps', to the multi-function device 10 through the SIP server (refer to S38 of FIG. 3).

The communication unit 54 of the multi-function device 10 acquires the 200 OK command from the multi-function device 70 through the SIP server (refer to S20 of FIG. 2). Then, the second transmission execution unit 86 of the multi-function device 70 transmits the image data, which indicates the FAX data received in the past by the multi-function device 70 and stored in the memory of the multi-function device 70, to the multi-function device 10. The first reception execution unit 58 of the multi-function device 10 receives the image data from the multi-function device 70 in accordance with the QoS value '1 Mbps' indicated by the 200 OK command.

(Modification to Case B of FIG. 5)

When a function corresponding to an application 'A4' is executed in the multi-function device 10, instead of the FAX reading function, the multi-function device 10 makes a request for three QoS values, like the case B of FIG. 5. In this case, the second selection unit 82 of the multi-function device 70 refers to the application table to acquire the transmission capability '500 kbps' that is associated with the application 'A4' (refer to S32 of FIG. 3). Then, the second selection unit 82 refers to the threshold table and selects the QoS value '512 kbps' (i.e., '512 kbps' is the minimum QoS value that can realize the transmission capability '500 kbps') associated with the range of the transmission capability '100 kbps or higher and lower than 600 kbps' including the acquired transmission capability '500 kbps'. Accordingly, the second selection unit 82 of the multi-function device 70 does not select the QoS value '1 Mbps' higher than '512 kbps.' In other words, the QoS value '1 Mbps' that drastically exceeds the transmission capability '500 kbps' of the multi-function device 70 is not selected. Therefore, the multi-function device 70 can transmit the image data for FAX reading to the multi-function device 10 in accordance with the appropriate band guarantee '512 kbps' corresponding to the transmission capability of the multi-function device 70.

Figure 6:
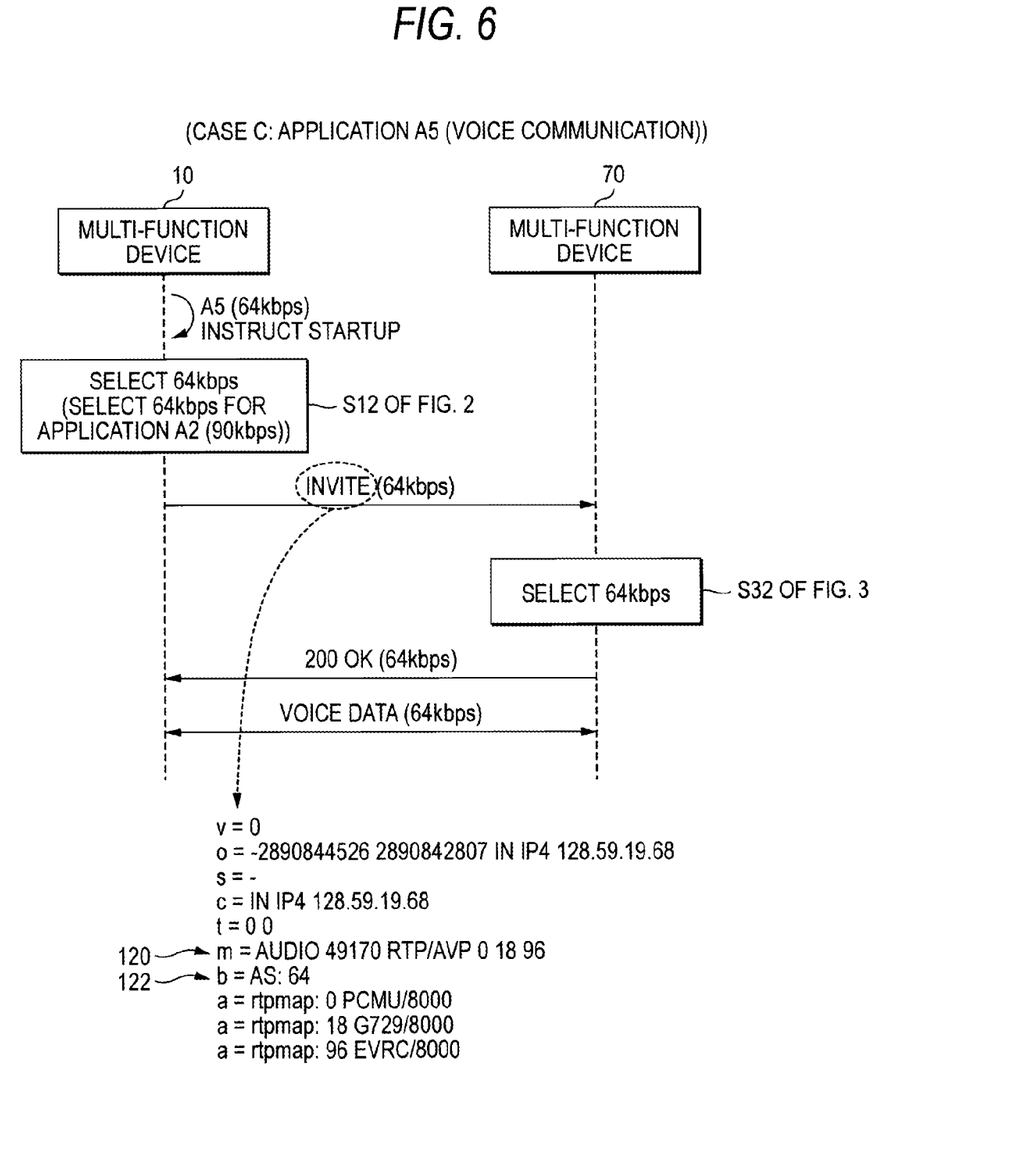
FIG. 6 shows a sequence diagram of a case C corresponding to voice communication.

(Case C of FIG. 6; Voice Communication Function (i.e., Telephone Function))

When the user of the multi-function device 10 selects the voice communication function, the first selection unit 50 of the multi-function device 10 determines YES in S10 of FIG. 2 because 'both of them' is associated with an application 'A5.' As a result, the first selection unit 50 refers to the threshold table 38 and selects a QoS value '64 kbps' (refer to S12 of FIG. 2). Incidentally, the first selection unit 50 does not select the QoS values '512 kbps' and '1 Mbps' that are higher than '64 kbps.'

Then, the request unit 52 of the multi-function device 10 writes 'audio' in the m line 120 of the INVITE command (refer to S16 of FIG. 2) and writes the selected QoS value '64 kbps' in the b line 122 of the INVITE command. The request unit 52 transmits the INVITE command to the multi-function device 70 through the SIP server.

The acquiring unit 80 of the multi-function device 70 acquires the INVITE command from the multi-function device 10 through the SIP server. Since 'both of them' is associated with the application 'A5', the second selection unit 82 of the multi-function device 70 determines YES in S30 of FIG. 3.

Then, the second selection unit 82 selects one QoS value '64 kbps' from the one QoS value '64 kbps' included in the b line 122 of the INVITE command (refer to S32 of FIG. 3). Then, the provision unit 84 of the multi-function device 70 transmits the 200 OK command indicating the one selected QoS value '64 kbps' to the multi-function device 10 through the SIP server (refer to S38 of FIG. 3).

Then, the communication unit 54 of the multi-function device 10 acquires the 200 OK command from the multi-function device 70 through the SIP server (refer to S20 of FIG. 2). Then, the first transmission execution unit 56 of the multi-function device 10 transmits voice data, which indicates voice input to a microphone (not shown) of the multi-function device 10, to the multi-function device 70 in accordance with the QoS value '64 kbps', and the second reception execution unit 88 of the multi-function device 70 receives the voice data from the multi-function device 10 in accordance with the QoS value '64 kbps.' In addition, the second transmission execution unit 86 of the multi-function device 70 transmits voice data, which indicates the voice input to a microphone (not shown) of the multi-function device 70, to the multi-function device 10, and the first reception execution unit 58 of the multi-function device 10 receives the voice data from the multi-function device 70 in accordance with the QoS value '64 kbps.'

(Modification to Case C of FIG. 6)

When a function corresponding to an application 'A2' is executed in the multi-function device 10, instead of the voice communication function, the first selection unit 50 refers to the application table 36 to acquire the transmission capability '90 kbps' associated with the application 'A2' (refer to S12 of FIG. 2). Then, the first selection unit 50 refers to the threshold table 38 and selects the QoS value '64 kbps' associated with the range of the transmission capability 'lower than 100 kbps' including the acquired transmission capability '90 kbps' (refer to S32 of FIG. 3).

In the followings, the case A of FIG. 4 and the modified exemplary embodiment of the case C of FIG. 6 are compared. In the case A of FIG. 4, the first selection unit 50 selects '512 kbps' as the QoS value corresponding to the minimum communication speed that can realize the acquired transmission capability '450 kbps' (further, selects '64 kbps'). However, in the modified exemplary embodiment of the case C of FIG. 6, the first selection unit 50 selects the QoS value '64 kbps' that cannot realize the acquired transmission capability '90 kbps', without selecting the QoS value '512 kbps' as the QoS value corresponding to the minimum communication speed that can realize the acquired transmission capability '90 kbps.' In other words, when a difference between the transmission capability and the QoS value '64 kbps' is larger than a predetermined value '36 kbps' (i.e., when a difference between the transmission capability '450 kbps' and the QoS value '64 kbps' is relatively large, like the case A), the first selection unit 50 selects '512 kbps' and '64 kbps.' However, when a difference between the transmission capability and the QoS value '64 kbps' is smaller than a predetermined value '36 kbps' (i.e., when a difference between the transmission capability '90 kbps' and the QoS value '64 kbps' is relatively small, like the modified exemplary embodiment of the case C), the first selection unit 50 selects '64 kbps.'

For a case where a difference between the transmission capability '90 kbps' and the QoS value '64 kbps' is relatively small, like the modified exemplary embodiment of the case C, even when the QoS value '512 kbps' is adopted, it is possible to perform the communication only at the communication speed '90 kbps' that is drastically smaller than '512 kbps.' Accordingly, in this exemplary embodiment, the QoS value '64 kbps' is selected. In this case, although only the communication speed corresponding to the QoS value '64 kbps' is realized, the user does not know that the communication speed is slow because the difference between the transmission capability '90 kbps' and the QoS value '64 kbps' is relatively small. Furthermore, the billing rate of the QoS value '64 kbps' is usually cheaper than the billing rate of the QoS value '512 kbps.' Therefore, since the communication rate becomes cheaper in a usual case, it can be said that the QoS value appropriate for the user is selected. According to this configuration, the multi-function device 10 can transmit the data to the multi-function device 70 in accordance with the appropriate QoS value corresponding to the transmission capability of the multi-function device 10.

For example, as shown in the case A of FIG. 4, the multi-function device 10 selects one or more QoS values '64 kbps' and '512 kbps', which are determined based on the transmission capability '450 kbps' with which the multi-function device 10 transmits the scan data, and provides the multi-function device 70 with the INVITE command indicating the one or more QoS values (i.e., makes a request for QoS value). Accordingly, the multi-function device 10 can transmit the scan data to the multi-function device 70 in accordance with the appropriate QoS value corresponding to the transmission capability of the multi-function device 10.

In addition, for example, as shown in the modified exemplary embodiment of the case B of FIG. 5, the multi-function device 70 selects the one QoS value '512 kbps', which is determined based on the transmission capability '500 kbps' with which the multi-function device 70 transmits the data by the application A4, in accordance with the request for three QoS values from the multi-function device 10. Then, the multi-function device 70 provides the multi-function device 10 with the 200 OK command indicating the one QoS value. Accordingly, the multi-function device 70 can transmit the data to the multi-function device 10 in accordance with the appropriate QoS value corresponding to the transmission capability of the multi-function device 70.

Further, in the exemplary embodiment, regarding each of the plurality of applications, the application table 36 stores the transmission capability for transmitting the data in accordance with the application. In S12 of FIG. 2 and S32 of FIG. 3, the multi-function device 10 and the multi-function device 70 refer to the application table 36 and acquire the transmission capability corresponding to the application for transmitting the data so as to select the QoS value based on the acquired transmission capability. According to this configuration, the multi-function device 10 and the multi-function device 70 can transmit the data in accordance with the appropriate QoS value corresponding to the transmission capability that corresponds to the application for transmitting the data.

The correspondence between the respective elements of the exemplary embodiments and the respective elements of the invention is described. The multi-function device 10 and the multi-function device 70 are examples of the 'first communication device' and the 'second communication device,' respectively. In the case A of FIG. 4, the INVITE command, the 200 OK command and the IPFAX (i.e., scan data) are examples of the 'first request command (or fourth request command)', the 'first response command (or fourth response command)' and the 'first type data (or fourth type data)', respectively. In addition, the results YES and NO in S10 of FIG. 2 are examples of the 'first case' and the 'second case', respectively. In the case A of FIG. 4, '512 kbps', '1 Mbps' and '64 kbps' are examples of the 'first communication speed', the 'second communication speed' and the 'third communication speed', respectively. In the meantime, the case A of FIG. 4 is an example of a case where the 'difference is greater than a predetermined value', and the modified exemplary embodiment of the case C of FIG. 6 is an example of a case where the 'difference is smaller than a predetermined value.'

In the case B of FIG. 5, the INVITE command, the 200 OK command and the data for reading (i.e., image data for FAX reading) are examples of the 'second request command (or third request command)', the 'second response command (or third response command)' and the 'second type data (or third type data)', respectively. In addition, the results YES and NO in S30 of FIG. 3 are examples of the 'third case' and the 'fourth case', respectively.

Modification to Exemplary Embodiments

The exemplary embodiments of the invention have been described. However, the exemplary embodiments are not to limit the scope of the invention. The technologies defined in the claims include the modified and changed examples to the above-described exemplary embodiments. For example, following modified exemplary embodiments can be exemplified.

Modified Exemplary Embodiment 1

Instead of the application table 36 and the threshold table 38 of the above-described exemplary embodiments, it may be used a table in which, for each of the plurality of applications, a QoS value is registered which is to be used when transmitting data in accordance with the respective one of the plurality of applications. In other words, a vender of the multi-function device 10 may predetermine, for each of the plurality of applications, a QoS value based on the transmission capability for transmitting data in accordance with the respective one of the plurality of applications and store beforehand the table in the memory of the multi-function device 10. For example, in the table, the application 'A1' corresponding to the IPFAX transmission function and the two QoS values '512 kbps' and '1 Mbps' are associated with each other. When the user selects the IPFAX transmission function, the first selection unit 50 selects the two QoS values '512 kbps' and '1 Mbps' that are associated with the application 'A1', in S12 of FIG. 2.

In other words, generally, the subject of the 'determination' in the sentence of 'one or more band guarantee values that are determined on the basis of the transmission capability for transmitting the first type data' may be the first communication device, like the above-described exemplary embodiments, or may be the vender of the first communication device, like this modified exemplary embodiment. Likewise, the subject of the 'determination' in the sentence of 'one band guarantee value that is determined on the basis of the transmission capability for transmitting the third type data' may be the second communication device or the vender of the second communication device.

Modified Exemplary Embodiment 2

In the above-described exemplary embodiments, as shown in the threshold table 38 of FIG. 1, (1) when the transmission capability is within the range of 65 to 99 kbps, the QoS value '64 kbps' that cannot realize the transmission capability is selected, and (2) when the transmission capability is within the range of 513 to 599 kbps, the QoS value '512 kbps' that cannot realize the transmission capability is selected. Instead, the threshold table 38 may be configured so that a QoS value capable of realizing the transmission capability is necessarily selected. Specifically, the threshold table 38 may be configured so that (1) when the transmission capability is below 65 kbps, a QoS value '64 kbps' is selected, (2) when the transmission capability is within a range of 65 kbps or higher and lower than 513 kbps, a QoS value '512 kbps' is selected, and (3) when the transmission capability is 513 kbps or higher, a QoS value '1 Mbps' is selected.

Modified Exemplary Embodiment 3

The 'transmission capability' in the application table 36 may be determined in such a way that the multi-function device 10 virtually executes an application in advance (for example, virtually executes the IPFAX transmission) and actually measures transmission capability of the multi-function device.

Modified Exemplary Embodiment 4

The 'communication device' may be a printer, a scanner, a mobile terminal (mobile phone, laptop PC, tablet PC, PDA and the like), a server, a PC and the like.

Modified Exemplary Embodiment 5

In the above-described exemplary embodiments, the respective units 50 to 58 and 80 to 88 are implemented by software. However, at least one of the respective units 50 to 58 and 80 to 88 may be implemented by hardware such as logic circuit and the like.

The technical elements described and shown in the specification and the drawings provide the technical usefulness independently or in combination and are not limited to a combination of the claims at the time of filing this application. Further, the technologies exemplified in the specification or drawings achieve the purposes at the same time and have a technical usefulness inasmuch as one purpose is realized.

What is claimed is:

1. A first communication device that is configured to be connected to a second communication device via a network, the first communication device comprising:
    a control unit; and
    a memory that stores a program including instructions to be executed by the control unit, wherein the instructions, when executed by the control unit, cause the control unit to function as:
        a first selection unit that is configured to, for a first case where first type data is to be transmitted from the first communication device to the second communication device, select two or more band guarantee values from a plurality of band guarantee values for transmitting the first type data, which are determined on a basis of transmission capability related to a speed that the first communication device generates the first type data, the two or more band guarantee values comprising:
        a first band guarantee value corresponding to a first communication speed that is a minimum communication speed capable of realizing the transmission capability with which the first communication device transmits the first type data; and
        a third band guarantee value corresponding to a third communication speed that is lower than the first communication speed; a request unit that is configured to provide a first request command, which indicates the two or more band guarantee values, to the second communication device;
        a communication unit that is configured to acquire a first response command, which indicates one band guarantee value that is selected from the two or more band guarantee values by the second communication device, from the second communication device in response to the first request command; and
        a first transmission execution unit that is configured to transmit the first type data to the second communication device in accordance with the one band guarantee value indicated by the first response command,
    wherein for the first case, when a difference between the transmission capability with which the first communication device transmits the first type data and the third communication speed is larger than a predetermined value, the first selection unit selects the first band guarantee value and the third band guarantee value without selecting the second band guarantee value, and
    wherein for the first case, when the difference between the transmission capability with which the first communication device transmits the first type data and the third communication speed is smaller than the predetermined value, the first selection unit selects the third band guarantee value without selecting the first band guarantee value and the second band guarantee value.

2. The first communication device according to claim 1,
    wherein for the first case,
        the first selection unit selects the first band guarantee value, and
    the first selection unit does not select a second band guarantee value corresponding to a second communication speed which is higher than the first communication speed.

3. The first communication device according to claim 1,
    wherein the memory is further configured to, for each of a plurality of applications, store the transmission capability with which the first communication device transmits the data in accordance with a respective one of the plurality of applications, and
    wherein for the first case where the first type data is to be transmitted from the first communication device to the second communication device in accordance with an application among the plurality of applications for transmitting the first type data, the first selection unit acquires the transmission capability corresponding to the application for transmitting the first type data from the memory and selects the two or more band guarantee values based on the acquired transmission capability.

4. The first communication device according to claim 1,
    wherein for a second case where second type data is to be received from the second communication device,
        the request unit further provides the second communication device with a second request command indicating the plurality of band guarantee values, and
        the communication unit acquires a second response command indicating one band guarantee value that is selected from the plurality of band guarantee values by the second communication device from the second communication device in response to the second request command, and
    wherein the first communication device further comprises a first reception execution unit that receives the second type data from the second communication device in accordance with the one band guarantee value that is indicated by the second response command.

5. A second communication device that is configured to be connected to a first communication device via a network, the second communication device comprising:
- a control unit; and
- a memory that stores a program including instructions to be executed by the control unit, wherein the instructions, when executed by the control unit, cause the control unit to function as:
  - an acquiring unit that is configured to, for a third case where third type data is to be transmitted from the second communication device to the first communication device, acquire a third request command indicating all of a plurality of band guarantee values from the first communication device;
  - a second selection unit that is configured to select one band guarantee value from the plurality of band guarantee values indicated by the third request command, the one band guarantee value being determined on the basis of transmission capability related to a speed that the second communication device generates the third type data;
  - a provision unit that is configured to provide the first communication device with a third response command indicating the one band guarantee value that is selected in accordance with the third request command; and
  - a second transmission execution unit that is configured to transmit the third type data to the first communication device in accordance with the one band guarantee value that is selected in accordance with the third request command;
  - wherein for the third case, the second selection unit selects the one band guarantee value corresponding to a minimum communication speed among a plurality of communication speeds corresponding to the plurality of band guarantee values, the minimum communication speed being capable of realizing the transmission capability with which the second communication device transmits the third type data, and
  - wherein for the third case, when a difference between the transmission capability of the second communication device and a communication speed that is lower than the minimum communication speed is smaller than a predetermined value, the second selection unit selects a band guarantee value corresponding to the communication speed that is lower than the minimum communication speed and,
  - wherein for a fourth case in which fourth type data is to be received from the first communication device,
    - the acquiring unit further acquires a fourth request command indicating two or more of the plurality of band guarantee value and
  - the second selection unit further selects, from the two or more band guarantee values indicated by the fourth command, one band guarantee value corresponding to a maximum communication speed of two or more communication speeds corresponding to the two or more band guarantee values.

6. The second communication device according to claim 5, wherein the memory is further configured to, for each of a plurality of applications, store the transmission capability with which the second communication device transmits the data in accordance with a respective one of the plurality of applications, and
wherein for the third case in which the third type data is to be transmitted from the second communication device to the first communication device in accordance with an application among the plurality of applications for transmitting the third type data, the second selection unit acquires the transmission capability corresponding to the application for transmitting the third type data from the memory and selects the one band guarantee value based on the acquired transmission capability.

7. The second communication device according to claim 5, wherein
the provision unit further provides the first communication device with a fourth response command indicating the one band guarantee value that is selected in accordance with the fourth request command, and
wherein the second communication device further comprises a second reception execution unit that is configured to receive the fourth type data from the first communication device in accordance with the one band guarantee value that is selected in accordance with the fourth response command.

* * * * *